(12) United States Patent
Zoppas et al.

(10) Patent No.: US 8,858,216 B2
(45) Date of Patent: Oct. 14, 2014

(54) PLANT FOR PRODUCTION OF PLASTIC CONTAINERS

(75) Inventors: Matteo Zoppas, Conegliano (IT);
Alberto Armellin, Vittorio Veneto (IT);
Sandro Serra, Oderzo (IT)

(73) Assignee: S.I.P.A. Societa' Industrializzazione Progettazione e Automazione S.p.A., Vittorio Veneto (IT)

(*) Notice: Subject to any disclaimer, the term of this patent is extended or adjusted under 35 U.S.C. 154(b) by 0 days.

(21) Appl. No.: 13/806,079

(22) PCT Filed: Jun. 24, 2011

(86) PCT No.: PCT/IB2011/052777
§ 371 (c)(1),
(2), (4) Date: Dec. 20, 2012

(87) PCT Pub. No.: WO2011/161649
PCT Pub. Date: Dec. 29, 2011

(65) Prior Publication Data
US 2013/0115325 A1    May 9, 2013

(30) Foreign Application Priority Data

Jun. 25, 2010  (IT) .............................. RM2010A0350

(51) Int. Cl.
*B29C 49/02* (2006.01)
*B29C 49/36* (2006.01)
(Continued)

(52) U.S. Cl.
CPC ................. *B29C 49/06* (2013.01); *B29C 47/00* (2013.01); *B29C 49/36* (2013.01); *B29L 2031/712* (2013.01); *B29B 2911/14033* (2013.01); *B29C 2043/3444* (2013.01); *B29C 49/4236* (2013.01); *B29C 2049/028* (2013.01); *B29C 49/6409* (2013.01); *B29C 49/12* (2013.01); *B29C 2043/3433* (2013.01); *B29C 47/0023* (2013.01); *B29B 2911/14333* (2013.01); *B29B 11/12* (2013.01);
(Continued)

(58) Field of Classification Search
CPC ........ B29C 49/02; B29C 49/36; B29C 49/06;
B29C 49/062; B29C 49/063; B29C 45/561
USPC ......... 425/526, 528, 529, 533, 534, 538, 540,
425/DIG. 221
See application file for complete search history.

(56) References Cited

U.S. PATENT DOCUMENTS 5,372,495 A * 12/1994 Ogura et al. ................... 425/522
5,531,580 A *  7/1996 Bonino et al. ................. 425/136
(Continued)

FOREIGN PATENT DOCUMENTS

WO    WO 2005-099986 A1    10/2005
WO    WO 2009-109829 A1     9/2009

*Primary Examiner* — Joseph S Del Sole
*Assistant Examiner* — Lawrence D Hohenbrink, Jr.
(74) *Attorney, Agent, or Firm* — Sampson & Associates, P.C.

(57) ABSTRACT

Plastic container manufacturing plant comprising devices for injection-compression of plastic in molds and effected by means of at least one rotary carousel actuated by electro-pneumatic actuators, of the single-stage type integrating at least one first rotary carousel (2) for molding of the preforms and a second rotary carousel (7) for stretch blow molding of the preforms. Moreover, the plant comprises a transport system (5) between said first (2) and second rotary carousel (7) comprising further handling wheels, of which at least one (8) comprises means for thermal conditioning of the preforms.

10 Claims, 13 Drawing Sheets

(51) Int. Cl.
  *B29C 49/42*   (2006.01)
  *B29C 49/64*   (2006.01)
  *B29C 47/00*   (2006.01)
  *B29L 31/00*   (2006.01)
  *B29C 43/34*   (2006.01)
  *B29C 49/12*   (2006.01)
  *B29B 11/12*   (2006.01)
  *B29C 49/06*   (2006.01)
  *B29K 67/00*   (2006.01)
  *B29C 45/56*   (2006.01)
  *B29B 11/14*   (2006.01)

(52) U.S. Cl.
  CPC ...... *B29C 49/063* (2013.01); *B29B 2911/1444* (2013.01); *B29C 49/061* (2013.01); *B29B 2911/14026* (2013.01); *B29B 2911/14213* (2013.01); *B29C 49/4205* (2013.01); *B29K 2067/00* (2013.01); *B29B 2911/14106* (2013.01); *B29C 49/02* (2013.01); *B29B 2911/1404* (2013.01); *B29C 45/561* (2013.01); *B29B 2911/14326* (2013.01); *B29C 49/062* (2013.01); *B29B 11/14* (2013.01); *B29B 2911/1402* (2013.01)
  USPC ........... 425/533; 425/526; 425/528; 425/529; 425/534; 425/538; 425/540

(56) References Cited

U.S. PATENT DOCUMENTS

| | | |
|---|---|---|
| 6,349,838 B1 | 2/2002 | Saito et al. |
| 2007/0228620 A1 | 10/2007 | Larsen |
| 2008/0220114 A1* | 9/2008 | Lefebure et al. ............. 425/526 |
| 2009/0127076 A1* | 5/2009 | Balboni et al. ............. 198/803.3 |

* cited by examiner

PLANT FOR PRODUCTION OF PLASTIC CONTAINERS

FIELD OF THE INVENTION

The present invention relates to a plant for production of thermoplastic containers, in particular of PET bottles, in two stages by injection-compression and stretch blow moulding.

PRIOR ART

At the present state of knowledge, the production of thermoplastic containers is a process by which, starting from the raw material, generally polyethylene terephthalate or PET, it is possible to obtain finished containers of a shape, even particularly complex, that meets the most varied requirements of the market, and which are particularly light and strong even if subjected to high pressures at room temperature. The transition from PET in the raw state in the form of granules to the plastic container can be effected either with a single-stage process, or with a two-stage process. The single-stage process is carried out with a single plant in which the transition from PET to preform, via a stage of injection in moulds, and the transition from preform to plastic container, via the stage of stretch blow moulding, takes place continuously without allowing the preform to cool completely to room temperature, so that it still has some of the latent heat remaining from the injection stage, with some energy saving, since the preforms do not require much heat to be heated to the temperature at which the plastic must be for blow moulding.

Conversely, a two-stage process is carried out in two separate plants: one plant effects the transition from PET to preform, i.e. carries out the stage of injection of PET into injection moulds, and the other machine effects the transition from preform to plastic container in blow moulds by blow moulding, or by stretch blow moulding in the case of PET. The two-stage process can also be carried out in the same plant, which envisages injection of the preforms and blow moulding of the latter into bottles, but the two operations are performed at two different times, i.e. the preforms are left to cool after injection until they reach room temperature. Next, moving on to transformation of the preforms into finished containers, in particular bottles, it is necessary to provide heating of the preforms in suitable furnaces up to the temperature required for carrying out the process of blow moulding, or stretch blow moulding in the case of PET.

The reason why part of the market of container manufacturers prefers to use an integrated single-stage system is that a plant of this kind offers greater versatility, which results essentially from the fact that the production process takes place in a single machine. Greater versatility permits real-time modification of the production variables, adjusting them quickly and efficiently to the requirements of container manufacture. Moreover, in an integrated single-stage system an error in production of the preforms can be detected immediately in order to correct possible defects of the preform and of the finished plastic container.

In two-stage systems, in contrast, a defect occurring on preforms in the course of injection may be detected with a delay that may jeopardize several days of production. Moreover, the absence of immediate continuity between the two stages hampers storage of all the information about the life cycle of a preform, so that the stage of stretch blow moulding takes place without knowing the precise characteristics of the preforms being processed moment by moment.

From the technological standpoint, the hot forming process used for making thermoplastic containers is blow moulding, a technique that is particularly suitable for making hollow bodies. Blow moulding offers the great advantage that it makes it possible to manufacture containers with a body that is very wide relative to the mouth, such as bottles. Moreover, it is preferable to rotational moulding, because the duration of the production cycle, called the cycle time, is less. Blow moulding is a particularly fast and efficient production process, suitable for large-scale manufacture of containers, such as PET bottles for drinks. Reduced cycle times mean that plant costs can be spread over numerous pieces, the rate of production of which is even of the order of some tens of thousands per hour in larger installations. The key element from the economic standpoint is then the cost of raw material, e.g. PET, PE, PPE, PP, and consequently the amount of material used for making a single container.

The advantages of the single-stage process can be summarized in the following points:

Versatility: the process takes place in a single plant; the design of the preform and the process conditions can be optimized to produce finished containers with the best characteristics.

Maintaining the history of the preform: the preforms always arrive at the blow moulds in the same conditions. In the two-stage process even weeks may pass between moulding of the preform and the blow moulding operation, during which the storage conditions can influence the characteristics of the preforms, which can therefore give slightly different performance from one batch to the next.

Possibility of quick intervention for solving any problems: any defects found on the bottles can be corrected immediately, and on the same machine (during injection moulding or blow moulding); in the two-stage process passage from one plant to another is more complicated in that the changes to the process and the setting up are generally performed on different machines, sometimes even far apart.

Better appearance of the containers: the preforms do not come in contact with one another and therefore there is no risk of scratching, leading to containers with conspicuous lines. The blow moulding process does not cancel any surface defects of the preform, it amplifies them.

Absence of moisture: PET, in particular, is a hygroscopic material; a blow moulding machine uses preforms with minimum moisture content at least 100 times greater than that of the preforms produced with an integrated machine; in fact the non-oriented amorphous structure absorbs a considerable amount of water, the particles of which, infiltrating between the polymer chains, produce a "looser" molecular structure and act as lubricant in the stretch blow moulding stage, causing sliding of the macromolecules, with consequent decrease in efficiency of stretch blow moulding.

Finally, an advantage that is not negligible, the cost of production of the container on the single-stage machine is lower, because it is not necessary to allow the preforms to cool to room temperature before ejecting them, and then consume energy for heating them again before the blow moulding operation.

Single-stage plants comprise the steps described below, for example for making PET bottles.
    drying of the PET granules;
    plastication;
    injection moulding of the preform;

conditioning of the preform;
stretch blow moulding.

One reason why single-stage plants are not particularly widely used is because they are slow overall, as the process for production of a preform is much slower than the process for stretch blow moulding of said preform, so that this last-mentioned operation, which can already reach extremely high production capacities, must be slowed down to match the production capacity of the machine for injection moulding of the preforms.

This is due essentially to the types of moving parts and the type of system for injection moulding of the plastic, which requires very high power, mainly relating to the tonnage of the presses for closure of the injection moulds.

Owing to these problems of slowness and the enormous forces involved, it is very difficult if not impossible to make rotary single-stage plants.

Another problem is that, to satisfy this power requirement, the actuators used in these machines are generally of the hydraulic type with serious problems of avoiding contamination of the preforms and containers with the hydraulic oils necessary for operation of the machinery.

SUMMARY OF THE INVENTION

The purpose of the present invention is to provide a plant for plastic container manufacture that is able to solve the aforementioned problem of high productivity of the complete plant and of quality of the finished containers.

The present invention relates to a plastic container manufacturing plant, according to claim 1.

A process called injection-compression for production of preforms, included in the integrated plant of the invention, comprises injection of plastic in a partially open mould; this is followed by closure of the mould and the stage of compression of the latter to obtain the preform. This comprises lower power values and in particular lower power of the injection plant and lower tonnage of the press used for compression of the mould.

Moreover, said process ensures reduced stress on the materials, enabling containers to be produced with thin walls with high surface quality, such as in the case of optical applications, displays, glass for cars, electronic and lighting components.

The advantages of this injection-compression process for production of preforms relative to conventional injection processes are:
  lower temperature of the molten plastic (the melt): transfer of the plastic from the plastication machine to the injection-compression mould can take place at a temperature just above the melting point of the resin owing to the shortness of the feed channels used;
  the pressures for transfer of the molten plastic are much lower (about 200 bar) against a much higher material feed rate (30 g/s) relative to conventional methods;
  the holding pressure in the mould during the preform compacting cycle is provided by the movement of insertion of a punch in a mould, rather than by the system for injecting the molten plastic, so that the tonnage of the press can be reduced to 2 ton/cavity; this means that during cooling, there is no transfer of further material into the mould and there is a constant pressure throughout cooling, ensuring optimum contact with all the moulding parts that receive heat from the plastic;
  maintenance of contact with the moulding parts improves heat exchange in the injection-compression process relative to an injection process; in fact in the injection process, at the end of the holding phase, there is a gradual release of pressure due to the shrinkage of the plastic as it cools and consequently lower contact pressure with the mould cavities;
  it becomes possible to produce articles with very small thicknesses as it is no longer necessary to transfer material into the mould during cooling of the preform;
  phenomena of crystallization of the bottom zone of the preform are minimized owing to better cooling of the seal/cavity bottom zone; in fact the seal remains closed for longer at equal cycle time and has a means of cooling the end part in contact with the mould cavity; this means an increase in quality of the container obtained and greater capacity of the latter to withstand phenomena of stress-cracking; moreover, a further advantage resulting from better cooling of the seal is improvement of the phenomenon of holes in the riser that are manifested in particularly forced injection processes;
  reduction of the temperatures and of the required pressure and tonnage of the presses has a favourable effect on energy consumption and on the wear of the mould components.

Integration of an injection-compression machine, which performs this process, in a container manufacturing plant of the single-stage type and replacement of hydraulic actuators with electric and/or pneumatic actuators makes it possible to obtain a reduction in cycle time and elimination of the risk of contamination of the containers with hydraulic oils.

According to a preferred embodiment of the invention this is achieved with an injection-compression plant of the rotary type.

Said injection-compression process, as well as making it possible to reduce the forces required for moulding the preforms, makes it possible to eliminate feedback control for said forces imparted to the moving parts. In addition to a gain in terms of speed and safety of the moulding elements, this makes it possible to use pneumatic actuators without feedback control instead of the conventional hydraulic systems.

The present invention teaches carrying out a moulding process of the preform with a platform of the rotary type that offers the following further advantages:
  high productivity;
  continuous process;
  process uniformity;
  modular design;
  reduced mechanical cycle time of opening/closing of the injection-compression mould;
  speed of format change;
  possibility of synchronization with the blow moulding wheel.

The absence of hydraulic actuators and the use of electric and/or pneumatic actuators for moulding of the preforms permits easy integration of the section for moulding the preforms with the section for stretch blow moulding of the containers and with the filling section. This means that the plant can be extremely compact, and in particular it makes it possible to guarantee and ensure absence of potential contaminants, such as hydraulic oil, from the entire plant to the benefit of maximum hygiene.

Moreover, integration of the process for injection-compression moulding of the preforms, blow moulding of the latter and, optionally, filling of the finished containers, guarantees maintenance of cleanness of the container which, just after moulding, is intrinsically free from any bacterial burden.

The dependent claims describe preferred embodiments of the invention, forming an integral part of the present description.

BRIEF DESCRIPTION OF THE DRAWINGS

Further characteristics and advantages of the invention will become clearer from the detailed description of preferred, but not exclusive, embodiments of a plastic container manufacturing plant, illustrated as non-limiting examples with the aid of the appended drawings in which.

The same reference numbers and letters in the figures identify the same elements or components.

DETAILED DESCRIPTION OF A PREFERRED EMBODIMENT OF THE INVENTION

A preferred embodiment of a plastic container manufacturing plant is described below with particular reference to the diagrams.

Figure 1:
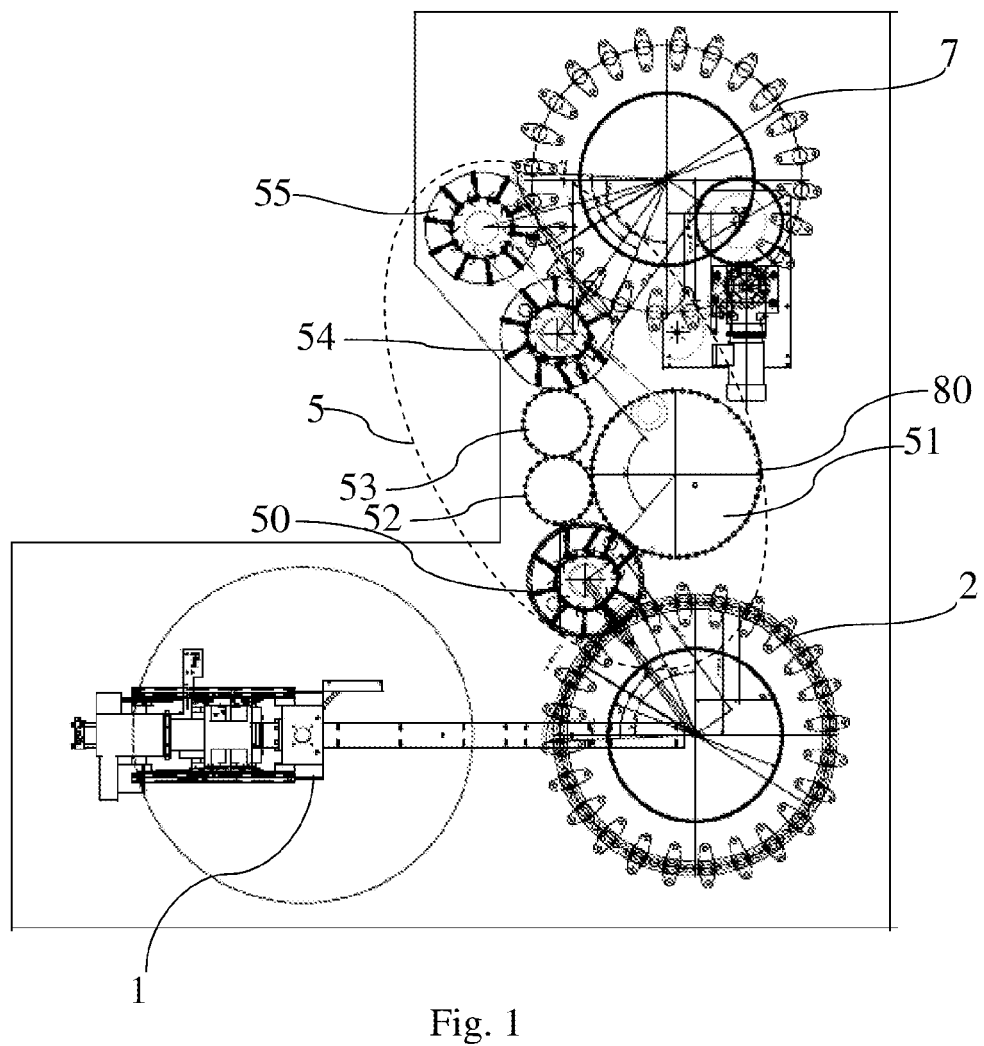
FIG. 1 shows a general plan view of a manufacturing plant according to the present invention.
Figure 2:
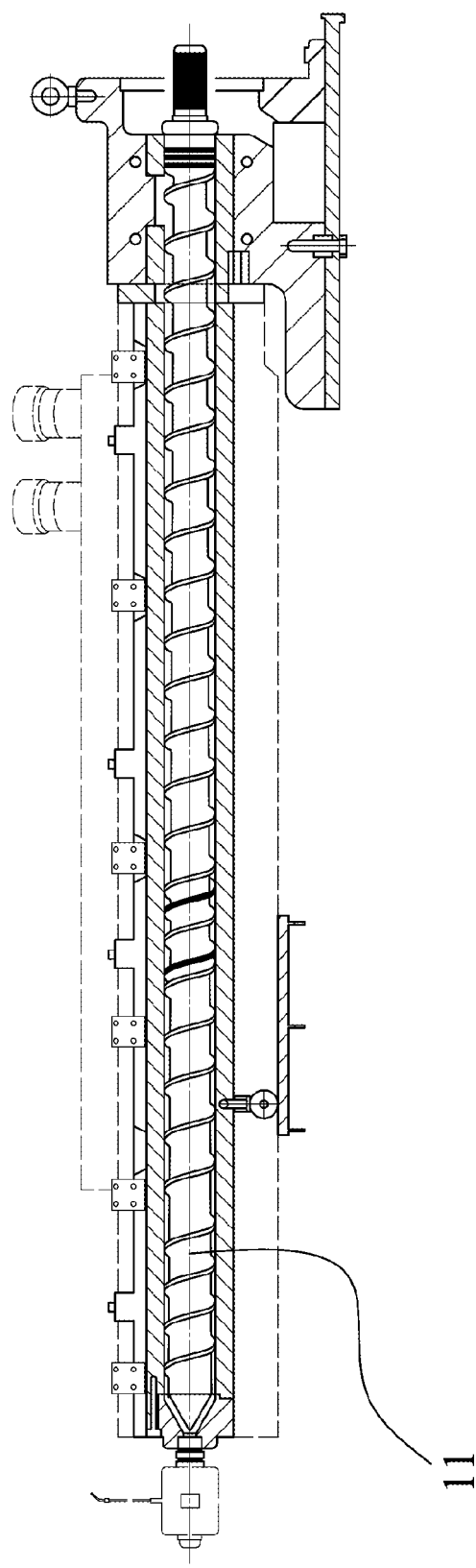
FIG. 2 shows a longitudinal section of a thermostatically controlled extruder of the plant.
Figure 3:
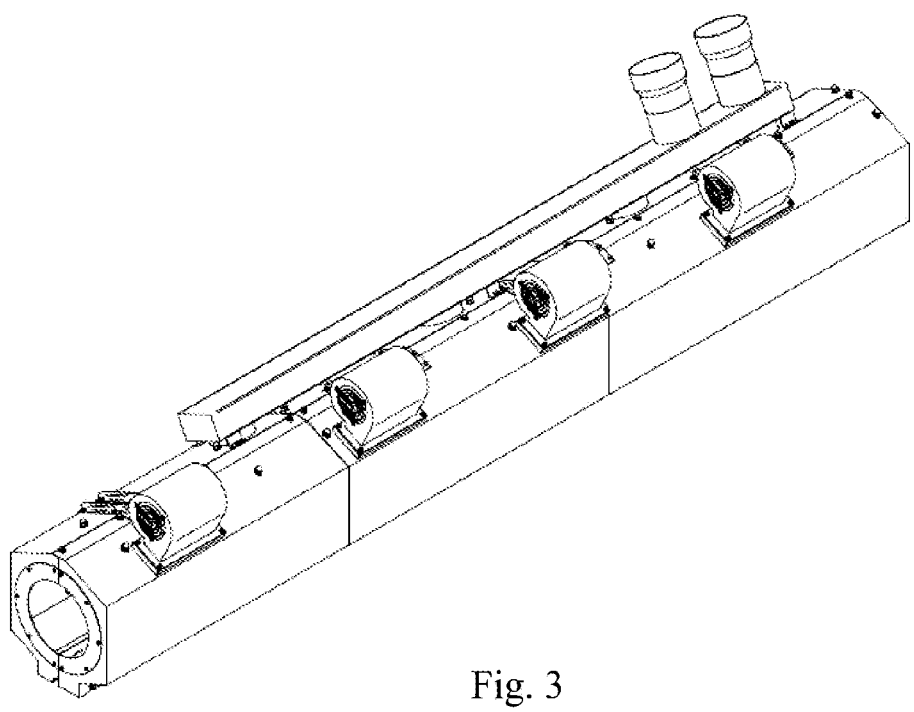
FIG. 3 shows an axonometric representation of the barrel of the extruder in FIG. 21.

FIG. 1 shows a schematic diagram of a plant of the rotary type for integrated injection-compression and stretch blow moulding of thermoplastic containers. The L-shaped configuration of the plant is only one preferred embodiment, and it can also be rectilinear or of other shapes.

The plant comprises a first part for production of the preforms comprising:

at least one extruder 1 which has the function of plasticating the polymer from the solid granular state to fluid by means of the energy supplied by heaters and by the frictional forces that are generated by the action of the extruder screw;

at least one first rotary preform-moulding carousel 2 that consists of a system for distribution of the polymer received from the extruder to each mould positioned on the outer perimeter of the carousel, by kinematic mechanisms associated with the movement of the carousel and by the injection-compression system for making the preforms.

Moreover, the plant comprises a second part for blow moulding the finished containers starting from the preforms produced by said first part; said second part, simply called the blower, comprises at least one second rotary carousel 7 for blow moulding which executes the stages envisaged in stretch blow moulding, in the case of PET for example, by the combined action of compressed air admitted into the preform in several stages, of a rod for axial stretching of the preform and of a mould into which the preform is blown and to the walls of which it is made to adhere by the internal pressure, which defines the final shape of the container.

Between said first and second part, the plant comprises at least one transfer system 5 of the preforms which are made to pass, optionally, through at least one system for thermal conditioning of the preforms.

A preferred extruder 1 is of the temperature-controlled type, which is able, by feeding the PET forward, to melt it, make it homogeneous and compress it. The extruder comprises a continuously rotating extruder screw 11, which does not require additional axial movements for compensating the variations in flow rate that are, however, typical of a conventional injection machine of the extruding-pumping type.

As the plant is of the rotational type, the flow rate of resin to be supplied to the first rotary carousel must be almost constant, for which the coupling of an extruder as described proves particularly advantageous because of the constant flow rate of plastic that it is able to generate.

Different types of extruder screws can be installed depending on the intended production capacity of the plant and therefore the number of mould cavities used.

The characteristics of the extruder are defined non-exhaustively by the following table, which, in relation to the screw diameter D supplies a preferred value of the ratio of screw length L to diameter D, the power of the motor driving the screw, the instantaneous delivery of the extruder and the rotary speed of the screw:

| Diameter | Ratio L/D | Drive | Motor power (kW) | Instantaneous delivery (kg/h) | Rotary speed (rpm) |
|---|---|---|---|---|---|
| 120 | 25 | Electric + reduction gear | 110 | 800 | 75 |
| 135 | 25 | Electric + reduction gear | 170 | 1000 | 75 |

Prior to plastication, the PET resin is suitably dried, lowering the moisture content of the granules to an optimum value for the subsequent process of plastication.

This process consists of transforming the polymer from solid to liquid by combined mechanical and thermal action that is able to impart a uniform distribution of physical properties to the resin and avoid problems associated with thermal degradation.

Plastication is a critical stage of the entire production process as it determines the ability of the resin to be formed and to endow the finished product with the desired characteristics.

The first rotary carousel 2 performs the following functions:

uncoupling of the extruder from the axle of the wheel by means of a rotating joint;

distribution of the flow of plastic from the axle of the wheel to the individual injectors/feeders positioned on the periphery of the wheel by means of a series of channels;

calibration of the volume of plastic to be moulded by volumetric filling of the injector/feeder and transfer of the volume of plastic from the injector/feeder into each moulding cavity;

moulding of the preform by inserting, in the moulding cavity, a mould punch movable along the axis of the cavity;

release of the moulded preform by opening the mould and ejection of the object into a transfer bowl with synchronized movement.

Some details of the first rotary carousel 2 are presented below.

Figure 10:
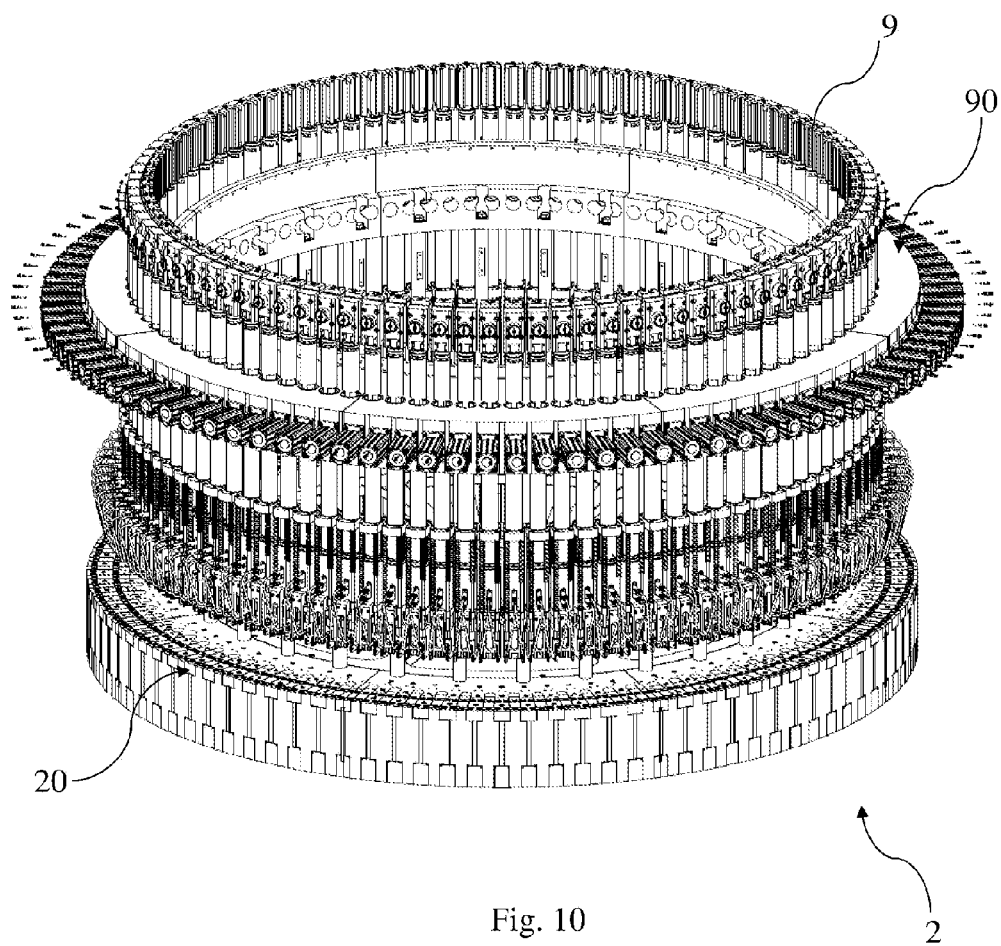
FIG. 10 shows a general view of said first rotary carousel.
Figure 11:
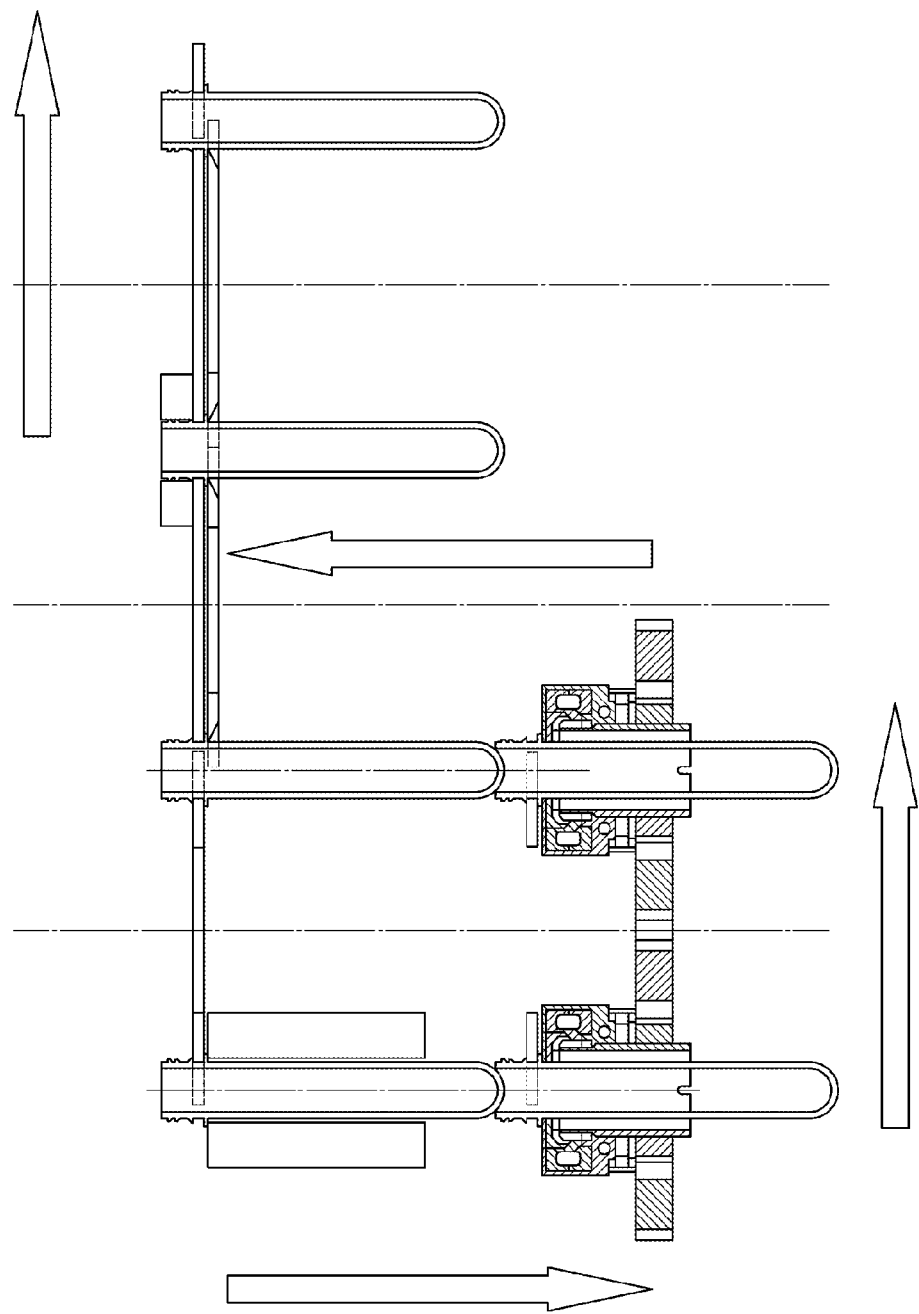
FIG. 11 shows a scheme for exchange of preforms from part of a transfer system of the plant in FIG. 1.

Referring in particular to FIG. 10, it comprises a first lower or moulding wheel 20 and an upper or compression wheel 90. Both wheels share one and the same rotation axis.

Figure 4:
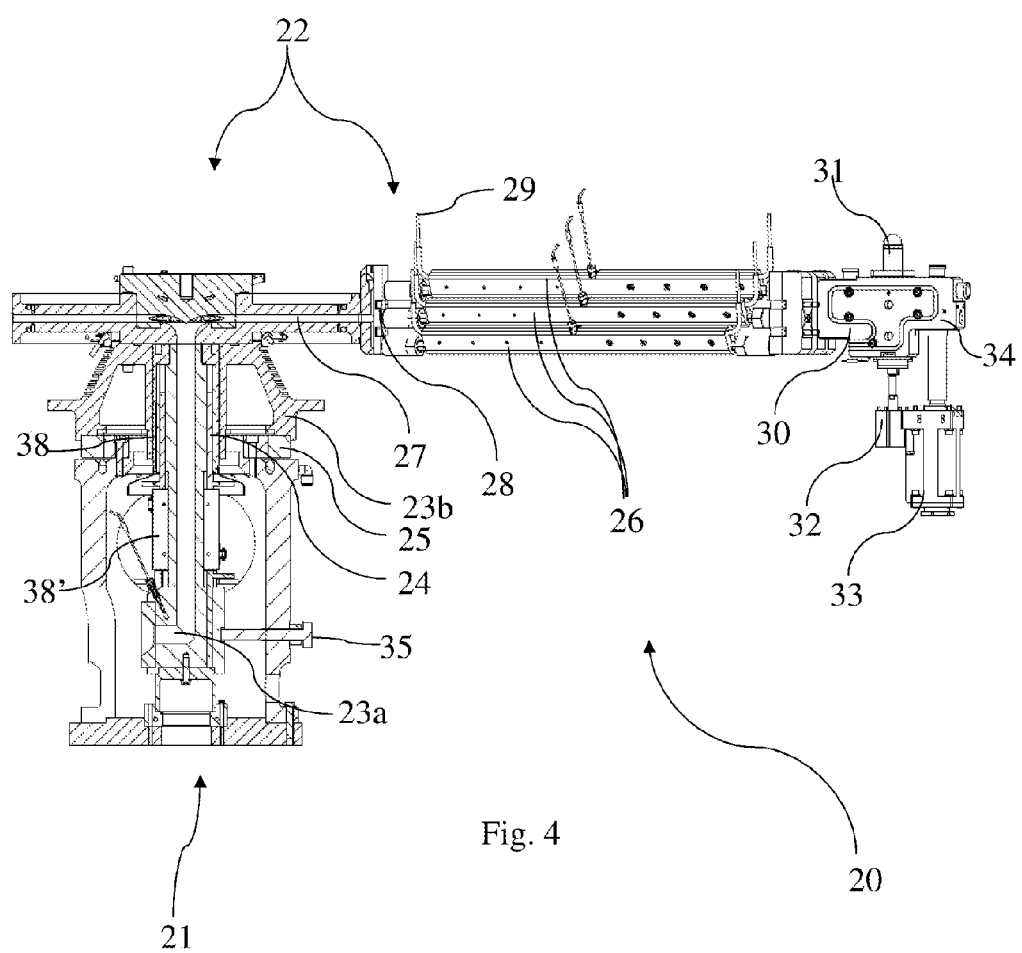
FIG. 4 shows an axial section of a part of a first rotary carousel of the plant.

Referring in particular to FIG. 4, said lower wheel comprises the following parts: a fixed central body 21, to which a wheel 22 is connected, rotatably, at the top. A coupling for transporting the melt is housed inside the fixed central body; said coupling comprises a first fixed part 23a inside the central body defining a channel for passage of the molten plastic with preferred diameter of 32 mm. The rotating part 23b of the coupling is defined in wheel 22 and comprises a labyrinth seal system 24 comprising a double-start spiral slot. This embodiment, owing to the relative rotary motion of the spirals relative to the fixed central part, creates a pumping effect that opposes exit of the melt under pressure. A thrust bearing 25 is interposed between the central body 21 and the wheel 22. From the moving part 23b of the coupling, the melt reaches lateral channels 26, with preferred diameter of 10 mm, first through a so-called first hot chamber 27, with preferred diameter of 13.5 mm, then through a, preferably three-way, distributor 28. Suitable electric resistors 29 are positioned inside the lateral channels 26 for maintaining a correct melting temperature of the plastic. At the end of said lateral channels 26 there is a second hot chamber 30 with further tubular resistors.

Suitable heating means 38 and 38' are positioned along said coupling inside the central body 21 and are able to keep the molten plastic at a specified temperature during passage through the coupling.

The melt is injected into the moulding cavity by an injector-feeder 34 heated by a resistive strip and connected to said second hot chamber 30. The injector-feeder 34 is actuated by an electric, electro-pneumatic, or pneumatic cylinder 33. A spool valve 36 opens/closes passage of the melt for filling the injector/feeder, see FIG. 6. Said spool valve 36 is actuated by an electric, electro-pneumatic, or pneumatic cylinder 32.

When said spool valve 36 is open, the molten plastic fills the injector/feeder 34; calibration of the dose is determined by mechanical stops 37 of the injector/feeder system, settable individually and manually.

Thus, the coordinated movement of said spool valve and of said injector/feeder, as well as the calibration of the mechanical stops, provide accurate dosing of the amount of plastic required for moulding a preform.

Figure 9:
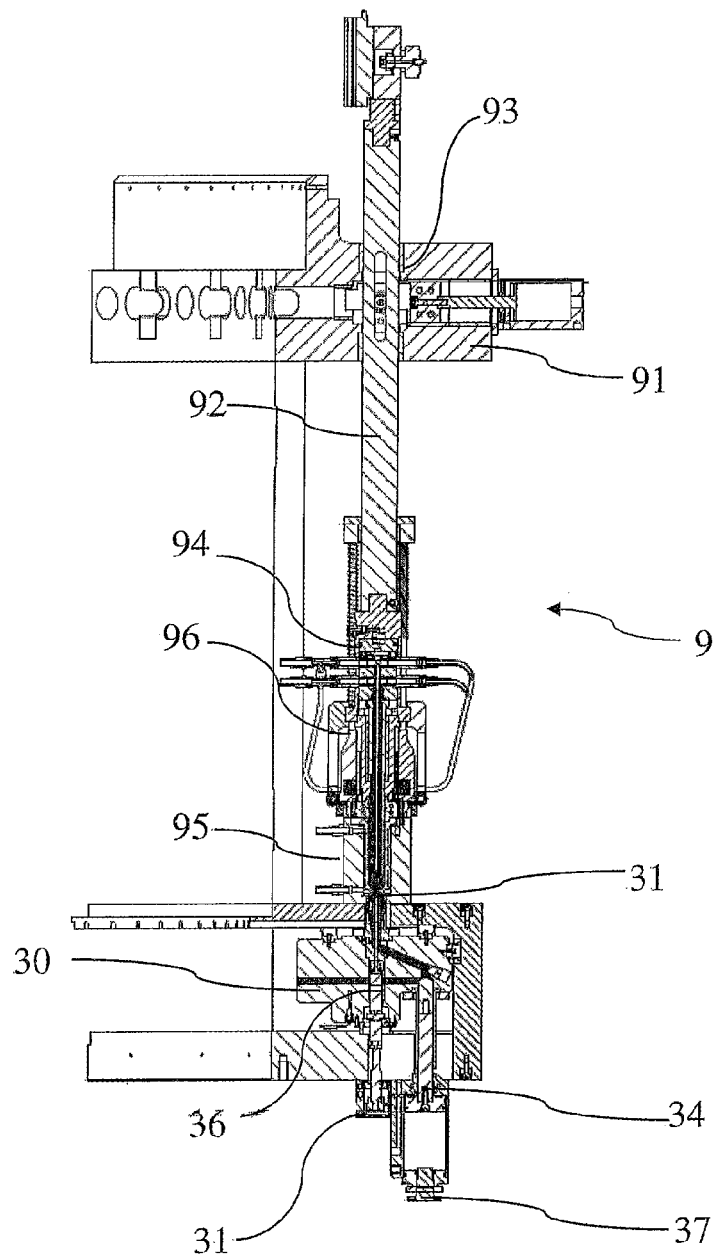

In particular, the spool valve opens when the injector is in the forward position (FIG. 9). There is then closure of the seal of nozzle 31 and the piston of the injector/feeder moves back under the action of the front of molten plastic under pressure received from the hot chamber. Then the spool valve closes and, simultaneously, the plug of the nozzle of the cavity opens and starts the compression movement of the injector/feeder. As the spool valve is closed during advance of the feeder, the melt is caused to pass into the moulding cavity through the nozzle-plug 31.

Said nozzle with plug 31, with preferred diameter of 4 mm of the strip-heated type, is positioned above the hot chamber 30 with axial extension parallel to the rotation axis of the carousel.

Said lower wheel 20 is connected to the extruder 1 by said fixed part 23a of the coupling. For supporting the thrust of the extruder 1, a thrust bearing 35 is provided, connected to the fixed part 23a of the coupling and to said central body 21.

The electric resistors inserted in the aforementioned parts are dimensioned to impart a thermal gradient to the melt to increase its viscosity inside the labyrinth seal 24 to make it practically solid. There is also a combination of effects: a pumping action due to the rotation of the aforementioned spiral that forces the melt in a direction (upwards) opposite to the exit direction (downwards) through the effect of the pressure inside the duct of about 200 bar.

According to a preferred variant of said first part of the plant, the extruder functions as a volumetric pump that generates the required delivery of plastic with a discharge pressure of about 200 bar; this pressure is sufficient to propel the molten plastic inside all the internal channels of the coupling and of the central hot chamber: said coupling of 32 mm diameter is connected to 32 channels of 13.5 mm diameter, each of which feeds a three-way distributor for a total of 96 tubes 26 of 10 mm diameter.

A preferred holding temperature of the melt is 270° C. and is guaranteed by said controlled tubular resistors in groups of six.

Moreover, it is preferable for the coupling to be cooled with water to maintain the temperature of the thrust bearing 25 at below 80° C. The entire distribution system is preferably arranged between two insulating shells to limit undesirable heat losses and improve energy efficiency.

Figure 5:
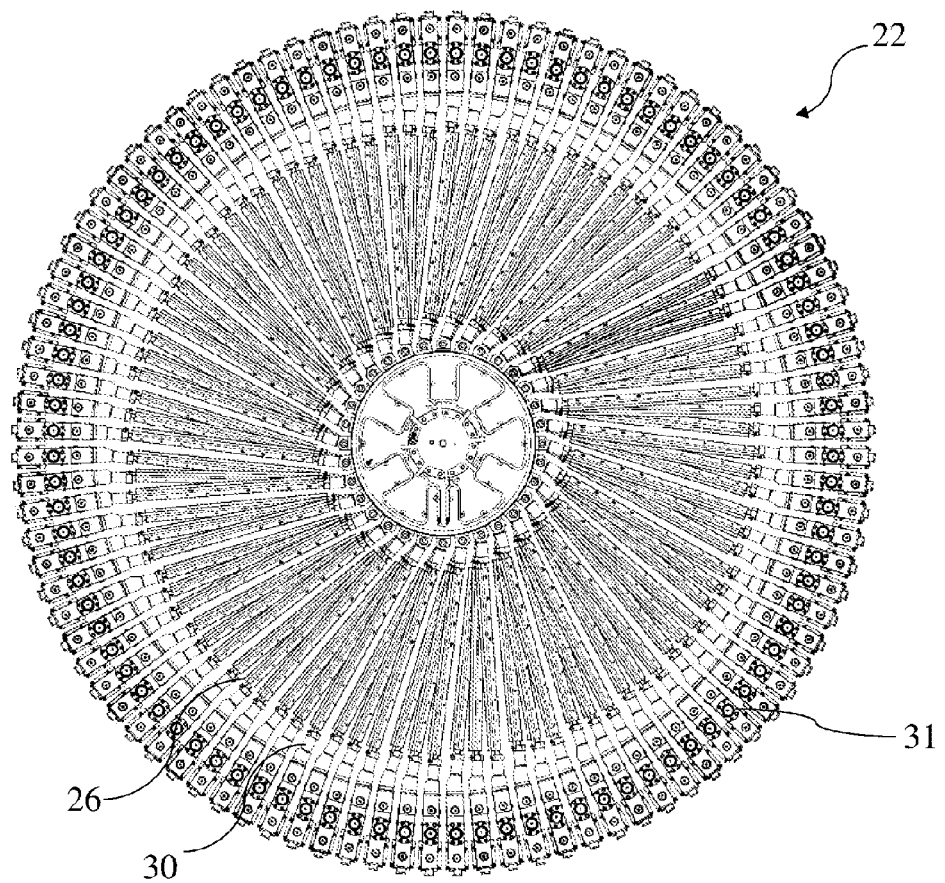
FIG. 5 shows a top view of said first part of the carousel in FIG. 4.

As can be seen from FIG. 5, the channels that carry the melt from the central body to the periphery of the wheel are not parallel to the spokes of the wheel; instead, the channels form an angle of about 20° clockwise, relative to the spokes. This particular geometry, combined with the presence of a ball joint at the end of each channel, makes it possible to compensate the thermal expansion of the channels (26) with a relative rotation between the central hub and the periphery of the injection-compression wheel 20.

Said first wheel 20 is arranged horizontally and a moulding device 9 is arranged above, at a peripheral part thereof, at least corresponding to a nozzle-plug 31. In a preferred configuration of the plant, the number of moulding devices is equal to the number of nozzle-plugs 31. Then a set of moulding devices 9 defines a second wheel 90, called the compression wheel.

Thus, the moulding process of the plastic material takes place by means of the compression wheel.

Said compression wheel 90 is also arranged horizontally and above said lower wheel 20. Said compression wheel comprises a supporting peripheral part 91, to which a movable rod 92 is connected as a sliding fit, with extension parallel to the rotation axis of the wheel. The rod 92 slides vertically relative to said supporting part 91.

The movable rod 92 is connected, at an end facing said plug 31, to a so-called ejection table 96 interacting with a mould punch 95a. The plug 31 permits injection of the melt into the cavity 95. The mould 95 comprises a compensation chamber 94 supplied with compressed air. The axial movement of rod 92 is blocked in some circumstances, described in more detail below, by pneumatic wedge 93, which prevents return motion of the rod itself and of the mould punch during feed of the melt into the mould.

Figure 6:
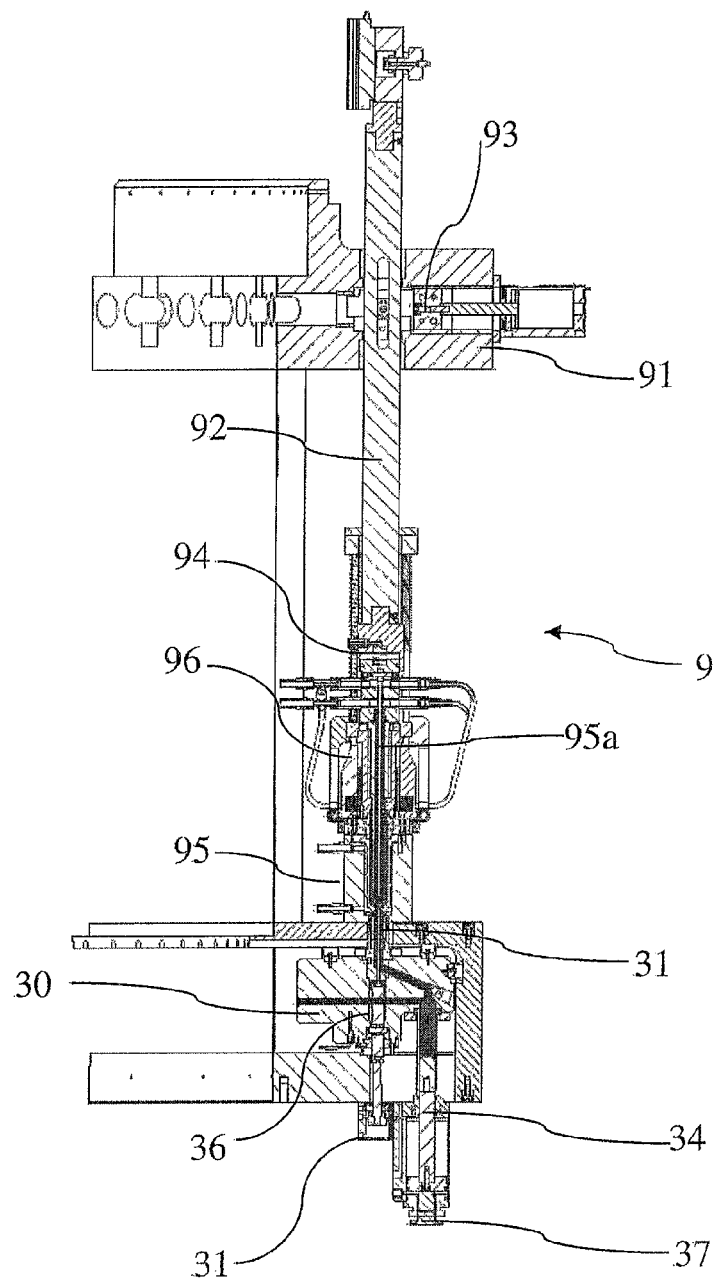
FIGS. 6-9 show a portion of a second part of said first rotary carousel.
Figure 7:
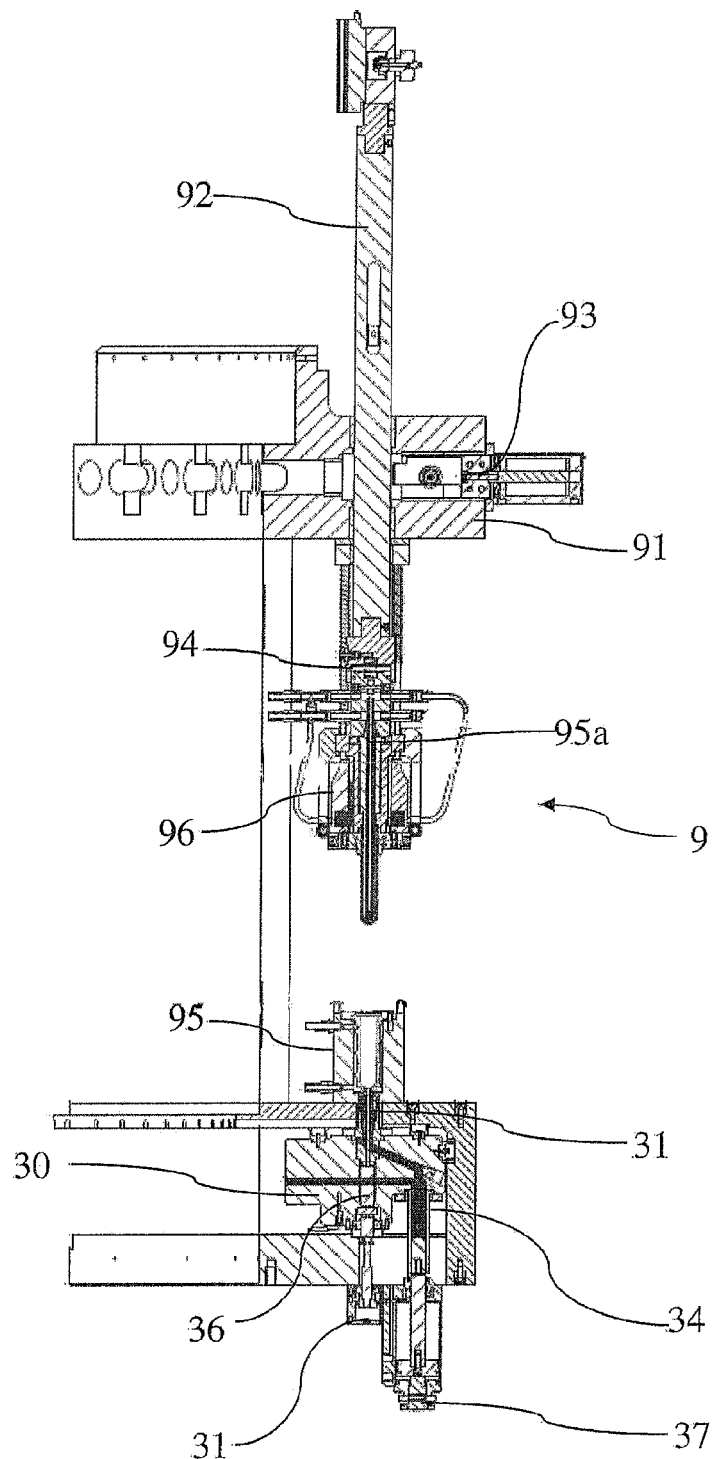
Figure 8:
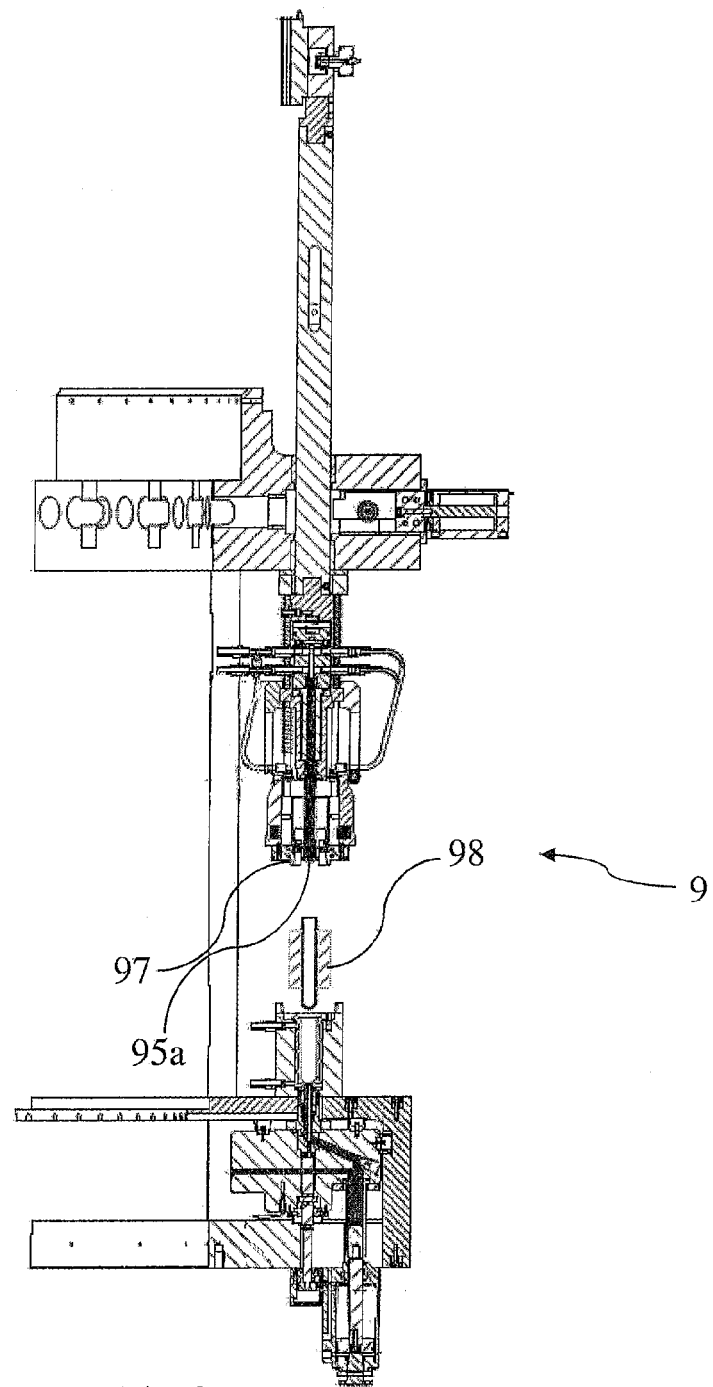

A preferred moulding process is described here and comprises the following phases:

moulding, see FIG. 6: a preform is moulded by means of an axial movement of rod 92 which operates the mould punch 95a which is telescopic relative to rod 92 owing to the compensation chamber 94; rod 92 is blocked by the pneumatic wedge 93, and air at high pressure, preferably between 30-35 bar, is injected into the compensation chamber 94, pushing the mould punch downwards; the molten material inside the cavity is thus subjected to a holding pressure, which depends on the ratio of the volume of the compensation cylinder to the volume of the mould punch, and to the simultaneous thermal cooling of cooled water that flows in suitable circuits inside the mould punch and to the moulding cavity 95; the downward movement of the mould punch defining a compression stroke, is necessary to make up for the shrinkage of the plastic due to the cooling; during this phase the spool valve 36 inside the hot chamber 30 is open to permit filling of the plastic in the injector/feeder 34; while the calibration of the dose is determined by the mechanical stops 37 of the injector/feeder system 34, which preferably is settable separately and manually relative to other stops of other moulding devices 9.

mould opening, see FIG. 7: at the end of cooling and holding of the preform, the pneumatic wedge 93 moves back, releasing rod 92, which moves back mechanically by means of a cam, lifting the punch and opening the mould; the opening travel required is always constant and equal to 380 mm and is independent of the type of preform moulded; simultaneously, the injector/feeder has completed its charging and the material inside it is maintained at a pressure of about 30 bar by the thrust of the pneumatic cylinder 33 which operates the injector/feeder 34;

ejection of the preform, see FIG. 8: rod 92 is retracted, lifting with it the ejection table 96, then the preform is ejected from moulding cavity 95 by punch 95a, interacting with the ejection table 96, which comprises cheeks 97 of suitable shape corresponding to the external profile of the preform in the zone where the threaded part of the neck is made. Then the preform comes away from the mould punch as a result of further upward movement of the rod, since this movement is not followed by the ejection table 96, which remains held on plate 91. Finally said upward movement of rod 92 synchronizes the horizontal movement of opening of cheeks 97 which finally release the preform.

According to a preferred embodiment of the invention, the cheeks follow the profile imposed by a suitable cam in order to synchronize their movement of opening-release and closing-fastening of the preform, with the sliding of rod 92; in particular, at the moment when a preform is released, an associated transport bowl 98 is positioned below the preform to intercept it during its release. Immediately afterwards, the transport bowl 98 moves away to allow rod 92 to descend again for a new moulding cycle. Reclosing of the mould is prevented by a suitable cam that acts on rod 92, for as long as the transport bowl 98 is in a position of interference with the movement of the ejection table 96.

mould closure and filling of the mould cavity, see FIG. 9: rod 92 is caused to descend, moving the ejection table 96 downwards until it is coupled to the moulding cavity 95; if there are no obstacles to coupling, the pneumatic wedge 93 has the necessary space to be inserted and to block rod 92, imposing a force of 2-3 ton depending on requirements. The force of compression of rod 92 can be adjusted and is set to ensure closure of the mould with the necessary thrust; plug 31 is opened by the pneumatic operating cylinder 32 and simultaneously spool valve 36 closes to prevent the melt going back into the hot chamber 30; then, feeder 34 via plug 31 injects the melt into the mould cavity 95.

It then resumes from the holding phase with admission of air at high pressure into the compensation chamber 94.

The transfer system 5 transfers the preforms produced from rotary carousel 2, to the second rotary carousel 7, where blow moulding is carried out to obtain the finished containers.

The transfer system comprises a plurality of star wheels, some equipped with grippers positioned at the periphery of each wheel, others with semicircular seats. Said wheels move in synchronism with one another and with the carousels, ensuring perfect transfer of the preform at the tangential points.

The transfer system 5, according to a preferred embodiment, referring to FIGS. 1, 11-13, comprises five star wheels, but a different number of wheels, more or fewer, can be used:

a first star wheel 50 for transfer of the preforms from the first carousel 2 to a thermal conditioning station: said first wheel comprises a plurality of grippers on moving arms, actuated by cams/pins; a gripper comprises two half-shells made of plastic defining a hollow cylinder intended to receive a preform that has just been moulded, for this reason said gripper is also called a bowl gripper. The half-shells of the grippers, at the moment of transfer of the preforms in wheel 50, at a tangential point between wheels 50 and 51, are held open to prevent interference between said shells and the preform during mould opening and to reduce the time taken for discharge of the preform. At the moment of passage of a preform to the next wheel 51, the two shells only open after the preform has been grasped by one of the grippers positioned on wheel 51;

a second thermal conditioning wheel 51 comprising active grippers operated by cams and associated pins and synchronized with said first wheel 50 and by a wheel 80 integral with wheel 51 and situated on a lower, parallel plane. Said wheel 80 comprises, along a peripheral zone, a set of rings 8 heated by induction and intended for conditioning the preforms. Each one of said grippers operates on the position of the preform corresponding to the seal tearing ring of the neck of the preform. Said second wheel 51 comprises means for moving the grippers following a vertical axis, i.e. parallel to the rotation axis of the second wheel 51 comprising wheel 80, to allow the preforms 100 to be lowered by an amount equal to the height of said preforms for inserting the preforms in the conditioning wheel 80. Referring to the arrows in FIG. 11, a preform 100 is grasped by a gripper of wheel 51, and is carried down into a heating ring of wheel 80; after a certain time, the same gripper lifts the preform again and passes it to the star wheel 52. In particular, after a preform has been conditioned, said means for moving the grippers raise the preform by the same amount by which they were lowered, for synchronizing and coupling to the next, stabilization wheel 52. Preferably, the number of preform conditioning positions is equal to the number of conditioning rings 8, which depends on the time taken for conditioning each preform;

a third wheel 52 and a fourth wheel 53 for thermal stabilization: after said thermal conditioning, each preform needs to be stabilized thermally after a certain time in the open air; it is preferred if two identical star wheels exchange the preform utilizing the support of the neck on one side and of the neck ring on the other side. It is preferable for the number of stabilization stations to be equal to half the number of conditioning stations (for example, 30 stabilization stations are provided for 60 conditioning stations). This ratio proves best for the majority of preforms commonly used.

fifth star wheel 54 for inserting preforms on said second rotary carousel 7: this has the task of taking the preforms from said stabilization wheels and transferring them to said second rotary carousel 7 for stretch blow moulding of the containers;

a sixth wheel 55 is provided for taking the completed containers from said rotary carousel 7.

It is clear from the drawings that said rotary carousels and said transfer wheels are arranged horizontally, i.e. have their axes of rotation parallel to one another and perpendicular to the floor on which the plant is installed.

A thermal conditioning device 8 gives a preform an optimum temperature profile for the subsequent blow moulding process. It is preferable for heating to be provided by infrared radiation of a ring-shaped body heated to high temperature, between 800 and 1000° C., by means of current induced electromagnetically, providing an induction heater.

The shape of the ring must be compatible with the preform to be heated.

Figure 12B:
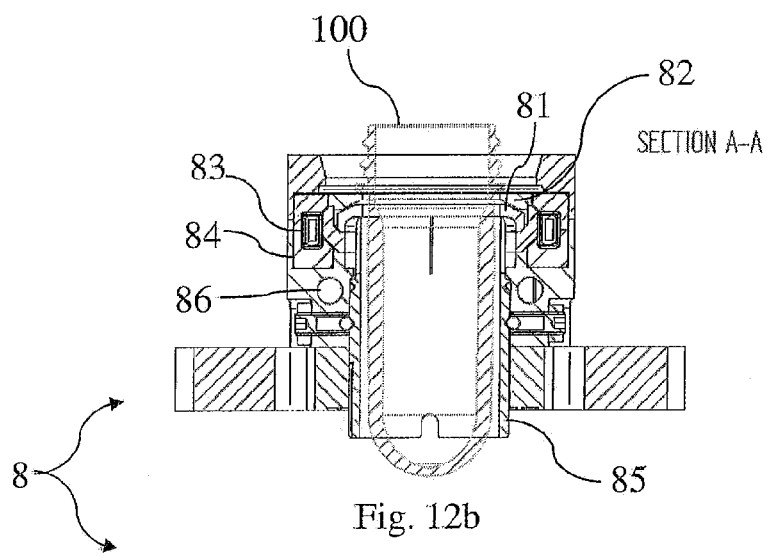
FIGS. 12a and 12b show respectively a plan view and a related section of a device of another portion of the plant in FIG. 1.
Figure 12A:
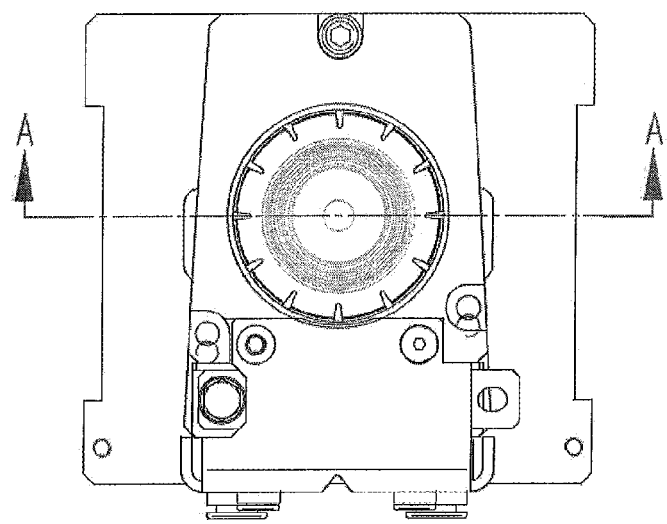

Referring to FIGS. 12a and 12b, said conditioning device 8 is of substantially hollow cylindrical shape and comprises:
- a heating ring 81 defining a part of said cylindrical cavity and enveloped externally to the cylindrical cavity by ceramic insulating rings 82;
- an electromagnetic inductor 83 is interposed between said heating ring 81 and said ceramic insulating rings 82 in order to induce currents in the heating ring 81.

The following may also be present
- magnetic flux concentrators 84,
- a heat shield 85 and
- channels for water cooling to prevent any overheating of the device.

A plurality of thermal conditioning devices 8 are arranged on a ring 80 positioned inside the periphery of a conditioning wheel. It is preferable for the ratio of the number of conditioning devices 8 to the mould cavities of said first rotary carousel 2 to be equal to 1.6. The number of stations required for the stabilization wheels is, in contrast, equal to the number of heating devices.

| Number of mould cavities on first rotary carousel 2 | Number of heating rings of furnace wheel | Total number of conditioning stations for each of said third and fourth wheels |
|---|---|---|
| 144 | 90 | 90 |
| 96 | 60 | 60 |
| 72 | 45 | 45 |

Figure 13A:
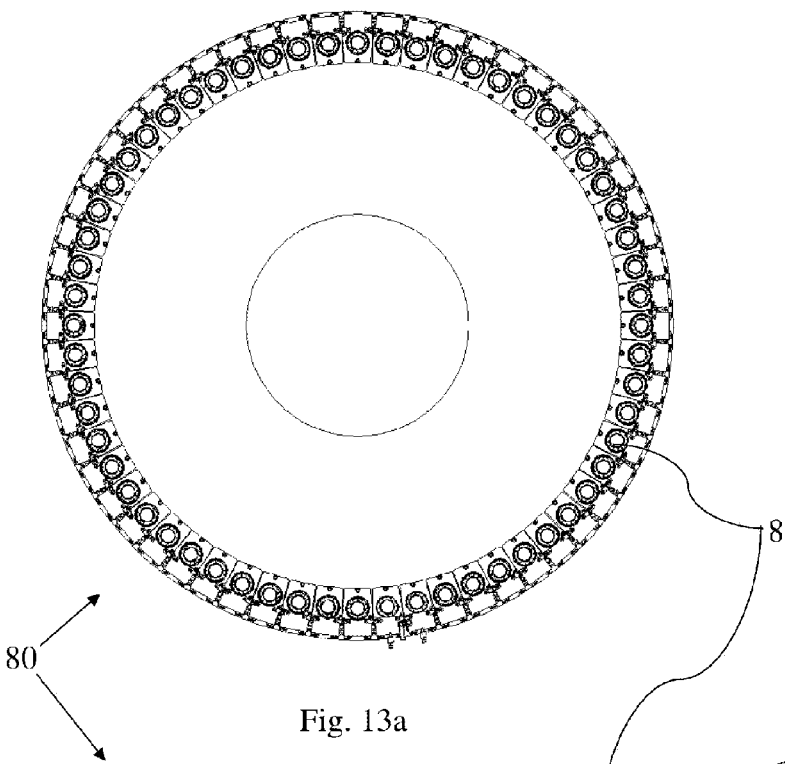
FIGS. 13a and 13b show respectively a general view and a detail of said portion of the plant according to FIGS. 12a and 12b.
Figure 13B:
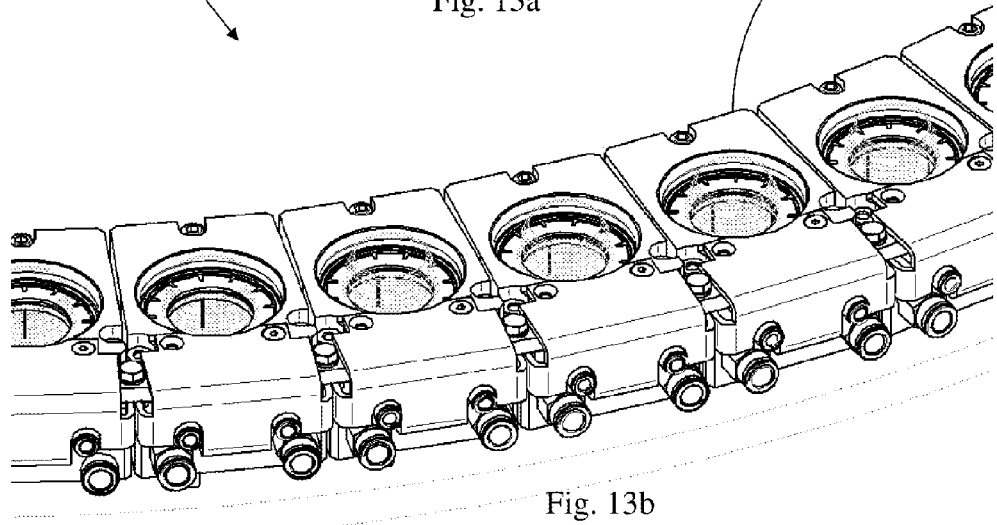

Referring to FIGS. 13a and 13b, these show a conditioning wheel 51 carrying the ring 80 along which the plurality of thermal conditioning devices 8 are arranged. Electric power supply to the inductors is provided by means of a rotating electrical coupling positioned on the rotation axis of the wheel; current, preferably at a frequency of 20 kHz, is generated by an IGBT electronic generator installed onboard the wheel, optionally rotating integrally with it. The cooling water of the generator and of the inductors is taken from the central rotary water coupling.

It is preferable for the plant to be housed in a booth, which has the purpose of maintaining constant conditions of temperature and humidity, cutting down the noise and preventing the operators touching moving parts and risking injury. Opening the doors causes immediate stoppage of the plant. The container production process is fully automated and the various stages are controlled by a computer. The computer screen and the control panel are outside the booth. The elements and characteristics illustrated in the various preferred embodiments can be combined while remaining within the scope of protection of the present application.

The invention claimed is:

1. An integrated production plant of thermoplastic containers, in particular made of PET, comprising
    a plurality of injection-compression devices of molten thermoplastics to produce preforms for blow-moulding said containers, forming and arranged at the outer periphery of a first rotational injection-compression carousel that comprises a lower wheel and an upper wheel, said lower wheel and upper wheel having a same and unique rotation axis, the upper wheel being arranged horizontally and above the lower wheel,
    a plurality of blow-moulding devices of the preforms, forming a second rotational carousel,
    transferring means for transferring preforms from said first carousel to said second carousel,
    thermal conditioning means for conditioning preforms, arranged between the plurality of injection-compression devices and the plurality of blow-moulding devices,
    wherein said plant comprises actuating devices of the electric or electro-pneumatic type for actuating all the movable component parts thereof, without employing hydraulic actuation devices.

2. The plant according to claim 1, wherein the transferring means between said first and second rotational carousels comprise at least one handling wheel for handling the preforms.

3. The plant according to claim 2, wherein the thermal conditioning means for conditioning the preforms are arranged along a periphery of a conditioning wheel integral with a handling wheel and located on a lower, parallel plane of said handling wheel.

4. The plant according to claim 3, wherein the transferring means comprise at least:
    a first wheel for collecting the preforms from said first rotational carousel, provided with grippers,
    a second thermal conditioning wheel provided with grippers configured to move along directions parallel to a rotation axis of the second wheel,
    third and fourth thermal stabilization wheels of semi-finished products in air,
    a fifth wheel for inserting the semi-finished products into said second rotational carousel.

5. The plant according to claim 4, wherein a ratio between a first number of conditioning devices of said conditioning wheel and a second number of moulding cavities of said first rotational moulding carousel is equal to 1.6.

6. The plant according to claim 5, wherein a number of seats/grippers of said third and fourth stabilization wheels is equal to said first number of conditioning devices of said conditioning wheel.

7. The plant according to claim 1, further comprising an extruder of rotational type provided with extruding screw of thermo-regulated type connected to said first rotational moulding carousel.

8. The plant according to claim 1, wherein a plurality of injection-compression devices defines a third rotational carousel overlapping said first rotational carousel and cooperating therewith in a stage of moulding preforms; said first and third rotational carousels defining together a fourth rotational carousel.

9. The plant according to claim 8, wherein said first rotational carousel comprises transit means for the transit of the molten thermoplastics, dosing means for dosing the molten thermoplastics in a moulding cavity, and wherein said third rotational carousel comprises a punch cooperating with said moulding cavity and extracting means for extracting a moulded preform from said moulding cavity.

10. The plant according to claim 1, further comprising at least a plastic container filling station of rotational type and/or at least a plastic container plugging station of rotational type and/or at least a plastic container labelling station of rotational type.

* * * * *